United States Patent [19]
Yoshimura et al.

[11] Patent Number: 6,165,624
[45] Date of Patent: Dec. 26, 2000

[54] ARTICLE AND METHOD OF PRODUCING A DOUBLE OXIDE FILM

[75] Inventors: Masahiro Yoshimura; Kyoo-Seung Han, both of Kanagawa Pref., Japan

[73] Assignee: Tokyo Institute of Technology, Tokyo, Japan

[21] Appl. No.: 09/190,713

[22] Filed: Nov. 12, 1998

[30] Foreign Application Priority Data

Nov. 12, 1997 [JP] Japan ..................................... 9-310630

[51] Int. Cl.$^7$ ............................. C25D 11/00; C25D 9/00; B32B 9/00; B32B 15/04
[52] U.S. Cl. ......................... 428/472.1; 148/95; 428/472; 428/472.2; 205/333
[58] Field of Search ..................................... 205/316, 320, 205/322, 323, 325, 326, 333; 428/472, 472.1, 472.2; 148/95, 240

[56] References Cited

U.S. PATENT DOCUMENTS

| | | | |
|---|---|---|---|
| 3,645,860 | 2/1972 | Fishman et al. | 204/171 |
| 4,921,738 | 5/1990 | Cassidy | 428/34.6 |

*Primary Examiner*—Kathryn Gorgos
*Assistant Examiner*—Wesley A. Nicolas
*Attorney, Agent, or Firm*—Knobbe, Martens, Olson & Bear, LLP

[57] ABSTRACT

In the formation of a double oxide film of Li element and a metal element other than Li element, a metal body of the metal element selected from the group consisting of Ni, Co, V, Fe, Cr and Al is immersed in an alkaline solution containing Li ion to conduct a hydrothermal reaction between the metal body and Li ion, whereby a double oxide film is formed on the surface of the metal body.

6 Claims, 6 Drawing Sheets

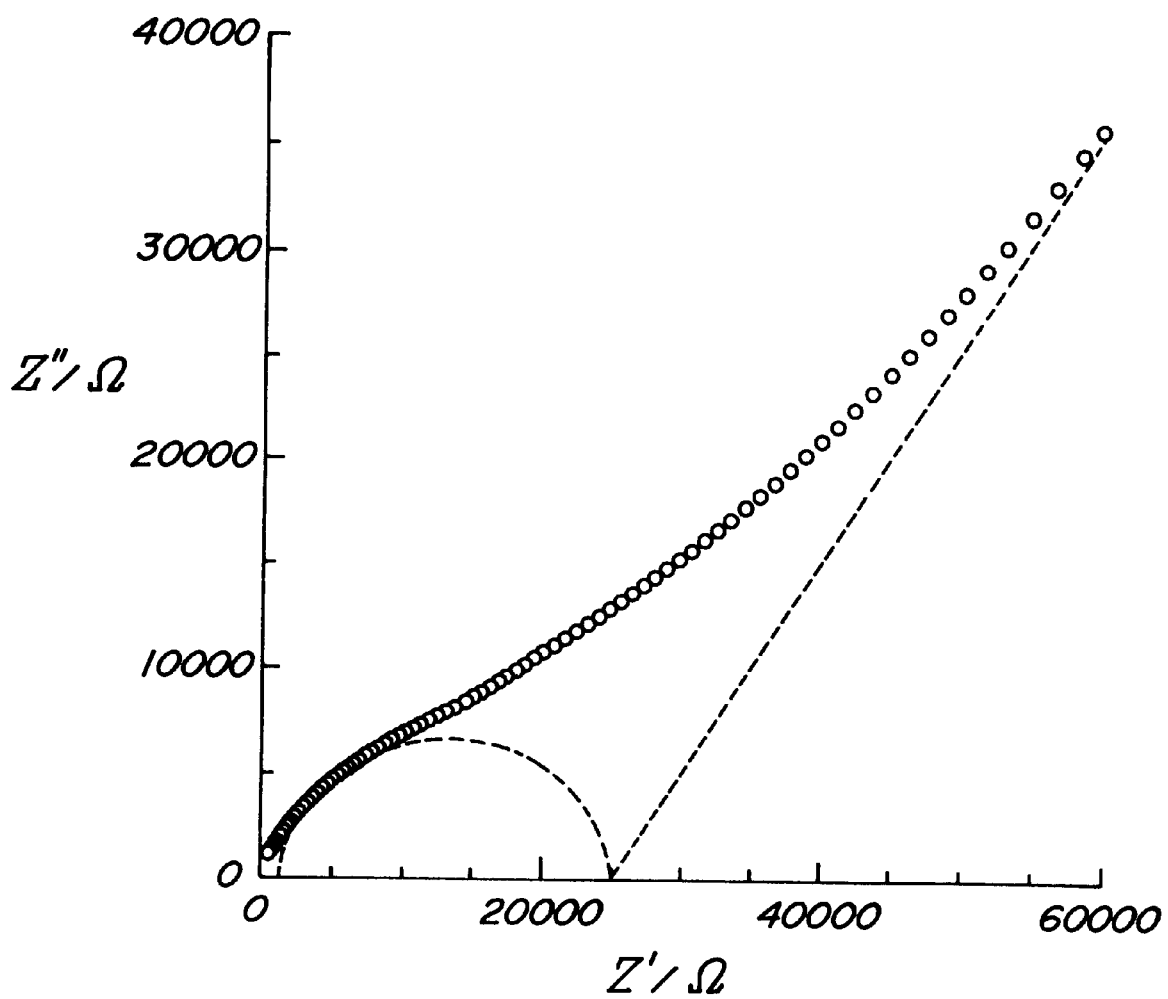
FIG_6

ARTICLE AND METHOD OF PRODUCING A DOUBLE OXIDE FILM

BACKGROUND OF THE INVENTION

1. Field of the Invention

This invention relates to a method of producing a double oxide film, and more particularly to a lithium double oxide, a double oxide/metal composite and a functional conductive material including such a film.

2. Description of Related Art

Lithium double oxides are considered as electrode material in a lithium battery and its derivatives such as electrochromic device. Because the lithium double oxides have layered structure, lithium ions can be intercalated and deintercalated into the interlayer space. If the components of the lithium battery such as cathode, electrolyte and anode can be made in a film form, the lithium battery can be miniaturized even to micrometer scale. The major difficulty in fabricating lithium microbatteries is in the preparation of the lithium double oxide film as cathode. Therefore, the preparation of such a thin film has been attempted in various places and fields.

As a usual process, physical vapor deposition (PVD) process has been used. Such a process generally includes (1) the preparation of lithium double oxide powder or its precursor, (2) the formation of a target through shape-forming and sintering and (3) the deposition of a thin film from the target. For the deposition, the target is evaporated or ionized by sputter, laser ablation or similar methods, and deposited onto a substrate to form a thin film.

The PVD process is a multistage process and requires a high energy consumption for high temperature heating or ionization at each stage in addition to the energy consumption to keep a vacuum. Furthermore, even if the prepared target has a desired composition, the structure and chemical composition of the prepared film are not identical to those of the target due to the selective vaporization of Li upon the course of evaporation or ionization. Moreover, the life time of the target is short. Particularly, when the composition of the target is modified upon the evaporation or ionization, such a target is almost a waste. Therefore, this process is not an efficient way in views of energy and material at all.

In chemical vapor deposition (CVD) process as another usual process, organic metal complexes, halides or similar chemicals having high reactivity are mixed in vapor phase, transported and reacted onto a heated substrate. Generally, the starting substances and precursors are expensive and often toxic. In addition, the development of large scale apparatus is difficult because a vapor supplying system, a substrate transferring system, a heating system and an evacuation system must be placed in a closed container. Further, the quality of the resulting product is inferior to that of the product prepared by PVD process.

In other words, the fabrication of lithium double oxide thin film is far from practical use at present. Only a thick film obtained by dispersing and firing lithium double oxide slurry on metal film has been put into practical use on small size battery system, but not on microbattery system.

SUMMARY OF THE INVENTION

It is, therefore, an object of the invention to provide a new method solving the aforementioned drawbacks such as ununiformity of the composition due to selective evaporation of lithium at a high temperature, difficulty in the film formation from vapor phase, problems in the multistage process and restrictions in the starting material or the apparatus derived from the ionization or vaporization.

According to a first aspect of the invention, there is the provision of a method of producing a double oxide film between a lithium element and a metal element other than the lithium element, in which the metal element is at least one element selected from the group consisting of Ni, Co, Mn, V, Fe, Cr, and Al, and which comprises a step of hydrothermal reaction between a metal body made of the metal element and a lithium ion in an alkaline solution containing the lithium ion to form a double oxide film of the metal element and the lithium element on a surface of the metal body.

The inventors have confirmed the following facts: (1) when a nickel metal plate or foil is immersed into a solution mainly composed of LiOH and then heated in an autoclave at a fixed temperature between 100 and 200° C. for 10–20 hours, lithium nickel oxide film is directly formed on the surface of the plate or foil through hydrothermal reaction; (2) when a direct current having a current density of around 1 $mA/cm^2$ is applied in the treatment of the above item (1), the quantity of the resulting film largely increases and the quality of the film is improved; (3) the surface of the resulting film is composed of fine and homogeneous lithium nickel oxide grains with a size of about 20 nm and has a uniformed chemical composition; (4) the lithium nickel oxide film has a satisfactorily strong adhesion force and is practically usual as a thin film electrode without any post-synthesis heat treatments; and (5) Li ion can be reversibly intercalated and deintercalated into the obtained film. In result, the invention has been accomplished.

According to the invention, the inventors have created a novel technique wherein the metal with particular shape of Ni or the like is activated and reacted in an aqueous solution containing Li ions to form directly a lithium double oxide in film form.

The invention has been accomplished by the application of a principle completely different from the conventional methods of producing lithium double oxide films so that the method of the invention has the following features: (1) the reaction between metal or metal alloy with particular shape and an aqueous solution containing Li ions; (2) the low temperature fabrication of lithium double oxide films with an excellent crystallinity; (3) the easy combination of other activation methods such as the simultaneous hydrothermal and electrochemical reactions to motivate an interfacial reaction even at very low temperature; (4) the composition, structure and properties of the resulting films can be easily controlled depending on the synthetic conditions such as the composition, concentration, volume and temperature of the solution, the applied current density, the reaction time and the like; (5) when metal or metal alloy with particular shape and size is applied to the treatment, lithium double oxide films with desired shape and size are fabricated; and (6) since the aqueous solution is used in the process according to the invention, the apparatus can be made into a completely closed circulation system and hence wastes and environmental loads can be minimized, and the like.

The term of "functional conductive material" used in the invention means a material transmitting, converting, amplifying recording or oscillating energy or signal through ion, electron and/or positive hole. The functional conductive material includes, for example, an electrode material, a sensor material, an electric conductive material, a recording material, an energy exchange material, a catalyst material, a light absorbing material, a photochromic material, an electrochromic material and the like.

DESCRIPTION OF THE PREFERRED EMBODIMENTS

The metal body used in the invention is composed of at least one metal element selected from the group consisting of Ni, Co, Mn, V, Fe, Cr and Al. It is formed that all these metals are easy to form a double oxide with Li ions. Among the metals, the use of Ni, Co, Mn, Fe and/or Al is favorable because their double oxides are easy to develop a lithium ion conductivity or to bring about the free access of the Li ion. Particularly, Ni and Co double oxides can be adopted as lithium battery materials.

In the invention, the above mentioned metals and alloys have been used as a body or a substrate. The metal body may have various shapes. As the result of the invention, if the metal body has, for example, a cylindrical or porous shape, the resulting film after the treatment may have a 1D, 2D or 3D pathway of lithium ions to give access to an inner part of the body.

Further, the metal body with the exact amount and thickness may be supplied so that the metal body may fully react to produce the lithium double oxide film. Therefore, metal films on the surface of another inert metal body or a non-metal body such as plastic, glass or the like can also be used as bodies in the method of the invention.

In the invention, such a metal body is immersed in an alkaline aqueous solution containing lithium ions. The preferable concentration of lithium is 0.1–5.0 mole/liter. When it is less than 0.1 mole/liter, very long reaction time is necessary to produce the desired film, or unexpected reactions may occur to form undesired material films. On the other hand, the concentration of 5.0 mole/liter is the solubility limit of a lithium salt. Therefore, when the concentration exceeds the solubility limit, excessive lithium species are unfavorably precipitated.

Moreover, lithium ions not contributing to the film formation remains in the solution. Since the use aqueous solution can be easily recycled after replenishing of Li salt due to the apparatus with completely closed circulation system, waste of substance can be minimized, which is also environmentally and economically beneficial. In this point, the usage of high concentration lithium solution is not at all a disadvantage.

In the invention, it is preferable that a direct current is applied to the metal substrate during the hydrothermal reaction. The direct current is preferable to have a current density of 0.001–50 mA/cm$^2$. When the applied current density is less than 0.001 mA/cm$^2$, long reaction time is required to produce the desired film. Otherwise, when it exceeds 50 mA/cm$^2$, the grains constituting the film become coarse or the surface of the film becomes rough.

For the hydrothermal reaction, autoclave should not be only used, but some container with heat, pressure and chemical resistance up to a certain point can be also used as a reaction vessel. The hydrothermal reactions are performed at a fixed temperature between 60 and 300° C. When the reaction temperature is lower than 60°C., it is difficult to form the desired film, or even if the film can be formed, its crystallinity is insufficient and the film properties are degraded. When it exceeds 300° C., the vapor pressure of the solution will exceed 80 atmospheric pressures and it is possible to occur several problems in the pressure, heat and chemical resistance of the reaction container.

The reasonable hydrothermal reaction temperature is 100–200° C. In this temperature range, it is easy to control the hydrothermal reaction and the properties of the resulting film. The films prepared between 125 and 175° C. show the prospective electrochemical activity for the electrode material.

BRIEF DESCRIPTION OF THE FIGURES

The invention will be described with the accompanying figures, wherein:

FIG. 6 shows the Cole—Cole plot of the prepared film.

The following examples illustrate the successful results of the invention.

EXAMPLE 1

A nickel metal plate is immersed in the 4M LiOH aqueous solution and then a direct current having a current density of 1.0 mA/cm$^2$ is applied to the plate at 150° C. for 20 hours by using the plate as anode.

The X-ray diffraction (XRD) patterns of nickel metal plates before and after the hydrothermal-electrochemical treatment are measured. The prepared film is analyzed using an X-ray photoelectron spectroscopy (XPS). The grain size of the crystal in the film is measured using an atomic force microscopy (AFM), and the thickness of the film is measured from its cross section view using a scanning electron microscopy (SEM). The analysis results are summarized in Tables 1 and 2 together with the results of the other samples.

Figure 1:
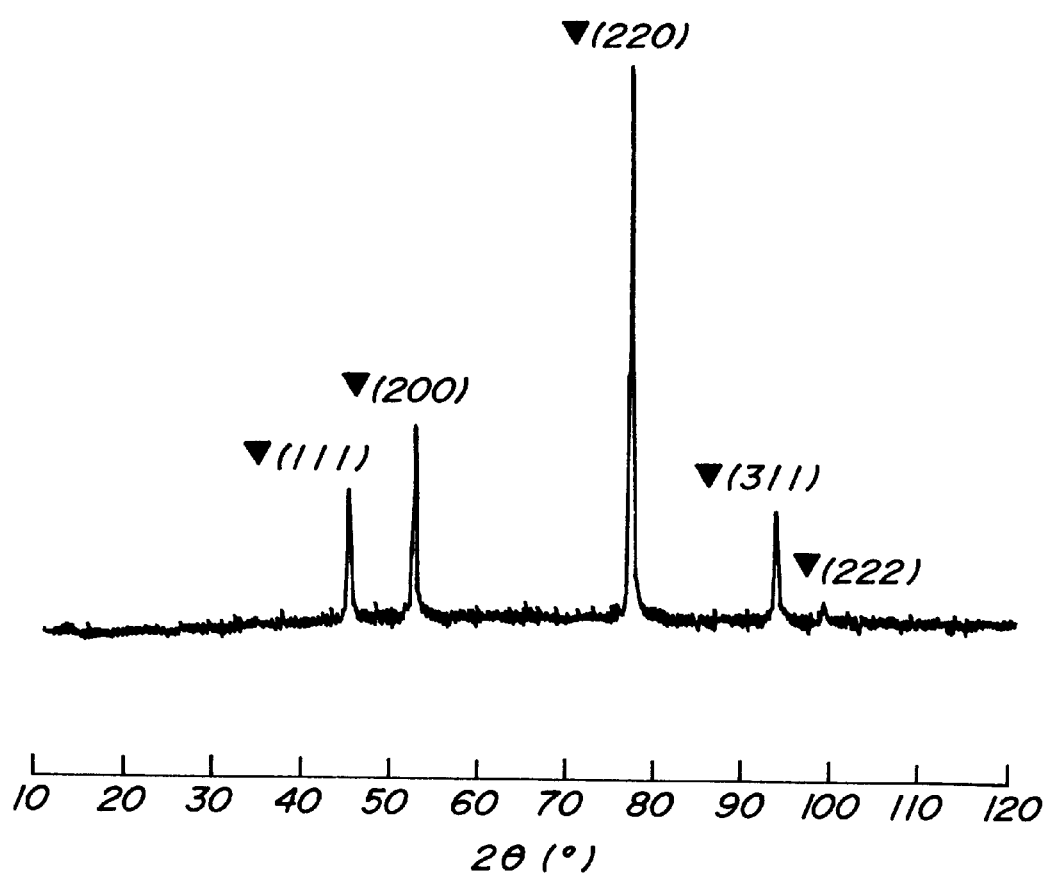
FIG. 1 shows the X-ray diffraction pattern of Ni metal plate.
Figure 2:
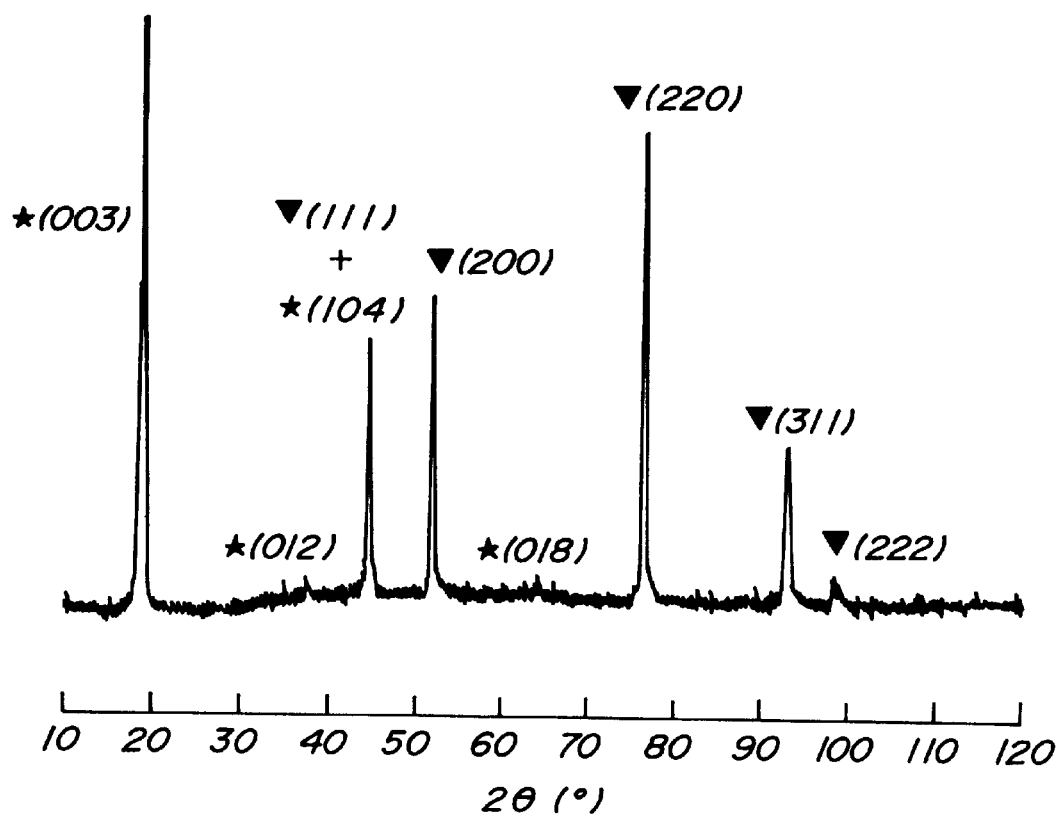
FIG. 2 shows the X-ray diffraction pattern of the lithium nickel oxide film formed on the surface of Ni metal plate.

FIG. 1 shows the X-ray diffraction pattern of nickel metal plate before the hydrothermal-electrochemical treatment. FIG. 2 shows the X-ray diffraction pattern of the nickel plate after the hydrothermal-electrochemical treatment. Peaks denoted by ▼ in FIGS. 1 and 2 are assigned to Ni metal, and peaks denoted by ★ are assigned to lithium nickel oxide. As shown in FIGS. 1 and 2, lithium nickel oxide is obtained on the Ni metal plate.

Figure 3:
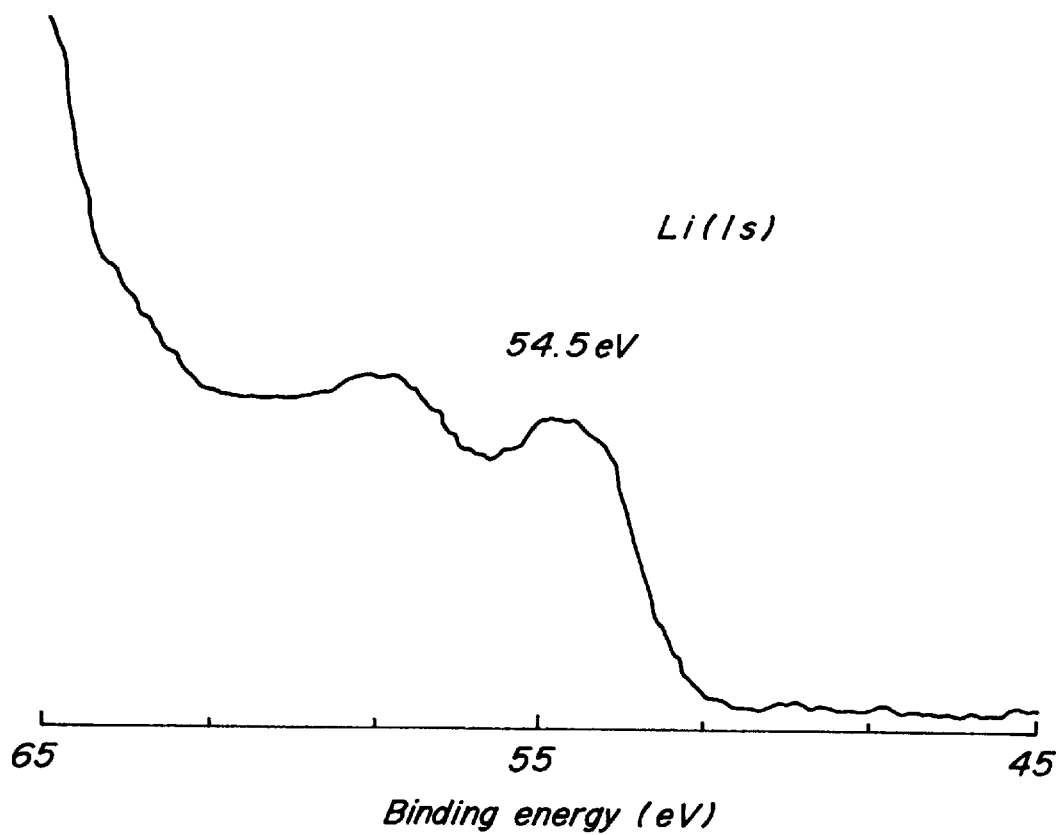
FIG. 3 shows the Li(1s) X-ray photoelectron spectrum of the prepared film.
Figure 4:
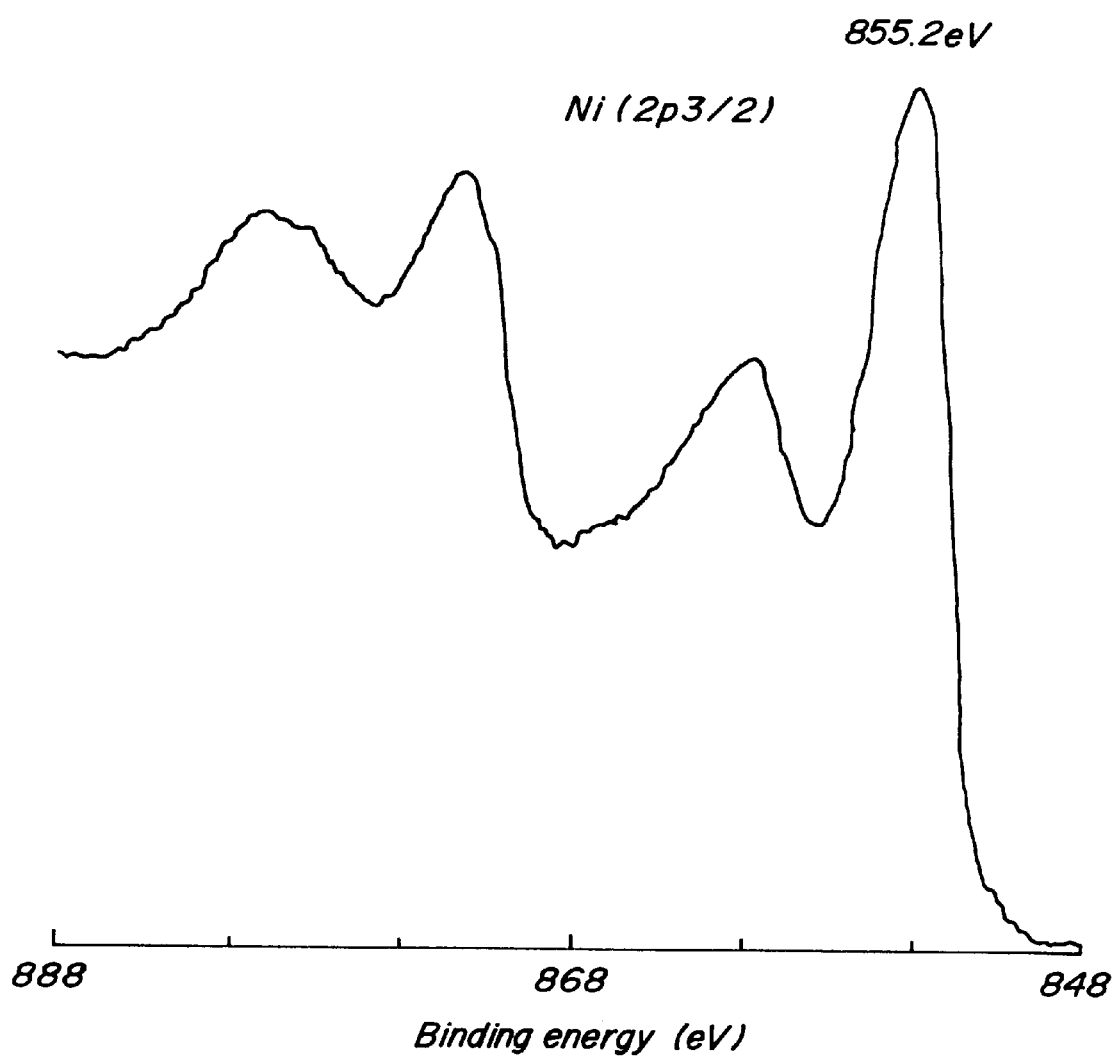
FIG. 4 shows the Ni(2p3/2) X-ray photoelectron spectrum of the prepared film.

FIG. 3 shows the Li(1s) X-ray photoelectron spectrum of the prepared film. FIG. 4 shows the Ni(2p3/2) X-ray photoelectron spectrum of the prepared film. As shown in FIGS. 3 and 4, the presence of both Li$^+$ and Ni$^{3+}$ in the prepared film is confirmed.

EXAMPLES 2–6

Lithium nickel oxide films are also prepared at different temperatures under the same electrochemical condition as Example 1 (galvanostatic charging at the current density of 1.0 mA/cm$^2$ and reaction time of 20 hours) (Example 2: 60° C., Example 3: 100° C., Example 4: 125° C., Example 5: 175° C. and Example 6: 200° C.).

The analysis results of X-ray diffraction pattern, X-ray photoelectron spectrum, grain size and thickness of each of the films obtained in Examples 2–6 are also summarized in Table 1.

TABLE 1

|  | XRD[1] | XPS[2] | Grain size ($\mu$m) | Film thickness ($\mu$m) |
|---|---|---|---|---|
| Example 3 (100° C.) | ○ | ○ | 0.16 | 7.8 |
| Example 4 (125° C.) | ○ | ○ | 0.53 | 21.1 |
| Example 1 (150° C.) | ○ | ○ | 0.30 | 16.7 |
| Example 5 (175° C.) | ○ | ○ | 0.26 | 15.6 |
| Example 6 (200° C.) | ○ | ○ | 0.24 | 14.4 |

[1]X-ray diffraction, ○: Detection of lithium nickel oxide
[2]X-ray photoelectron spectroscopy, ○: Detection of lithium nickel oxide As shown in Table 1, the well crystalline lithium nickel oxide films are evidently formed at a fixed temperature of 100–200° C. As shown in the case of Example 2, lithium nickel oxide film could be produced even at low temperature of 60° C. but very long reaction time is necessary to produce, thus the film properties are not summarized in Table 1. The film thickness and the grain size as a function of fabrication temperature exhibit a local maximum at 125° C.

EXAMPLES 7–11

Lithium nickel oxide films are also prepared at different applied current density under the same hydrothermal condition as Example 1 (fabrication temperature of 150° C. and reaction time of 20 hours) (Example 7: 0.01 mA/cm$^2$, Example 8: 0.1 mA/cm$^2$, Example 9: 0.5 mA/cm$^2$, Example 10: 3.0 mA/cm$^2$ and Example 11: 5.0 mA/cm$^2$).

The X-ray diffraction pattern, X-ray photoelectron spectrum, grain size and thickness of each of the films obtained in Examples 7–11 are analyzed likewise Example 1 to obtain results in Table 2.

TABLE 2

|  | XRD[1] | XPS[2] | Grain size ($\mu$m) | Film thickness ($\mu$m) |
|---|---|---|---|---|
| Example 8 (0.1 mA/cm$^2$) | ○ | ○ | 0.35 | 24.4 |
| Example 9 (0.5 mA/cm$^2$) | ○ | ○ | 0.29 | 18.3 |
| Example 1 (1.0 mA/cm$^2$) | ○ | ○ | 0.30 | 16.7 |
| Example 10 (3.0 mA/cm$^2$) | ○ | ○ | 0.30 | 17.8 |
| Example 11 (5.0 mA/cm$^2$) | ○ | ○ | 0.31 | 8.3 |

[1]X-ray diffraction, ○: Detection of lithium nickel oxide
[2]X-ray photoelectron spectroscopy, ○: Detection of lithium nickel oxide As shown in Table 2, the lithium nickel oxide films are evidently formed at a fixed current density of 0.01–5.0 mA/cm$^2$. In case of Example 7, the film properties are not summarized in Table 2 because very long reaction time is necessary to produce lithium nickel oxide film.

EXAMPLES 12–13

Lithium nickel oxide films are also prepared in the different LiOH concentration solutions under the same other conditions as Example 1 (fabrication temperature of 150° C., galvanostatic charging at the current density of 1.0 mA/cm$^2$ and reaction time of 20 hours) (Example 12: 1.0M LiOH solution and Example 13: 0.1 M LiOH solution).

When the concentration of lithium ion is higher than 1.0 mole/liter, lithium nickel oxide film is formed. On the other hand, when it is 0.1 mole/liter, unexpected composite film such as nickel hydroxide film is obtained.

EXAMPLE 14

The same treatment as Example 1 is applied to a nickel metal film on a conductive substrate such as a metal or a conductive plastic plate. In this case, the nickel metal film coated on the substrate is completely transformed into lithium nickel oxide film. It demonstrates that electrode material films can be directly deposited on electronics using the method in the invention.

EXAMPLES 15–18

The same treatment as Example 1 is applied to other metal plates such as Co (Example 15), Fe (Example 16), Cr (Example 17) and Mn (Example 18) metal plates inserted of nickel metal plate. In these cases, $LiCoO_2$, $LiFeO_2$, $LiCrO_2$ or $LiMnO_2$ film is formed as the resulting film.

Measurement of Cyclic Voltammetry

In order to test the electrochemical activity of the prepared films as an electrode, a cyclic voltammogram of the films has been recorded. The electrochemical characterization has been performed in 0.1M $LiClO_4$ propylene carbonate (potential is referred to the Li/Li$^+$electrode).

All of the prepared films exhibit prospective electrochemical activity, i.e. intercalation/de-intercalation of Li ion, however, it is dependent on the synthetic conditions. Especially, the films prepared at 125–175° C. (Examples 1, 4 and 5) show excellent reversibility.

Figure 5:
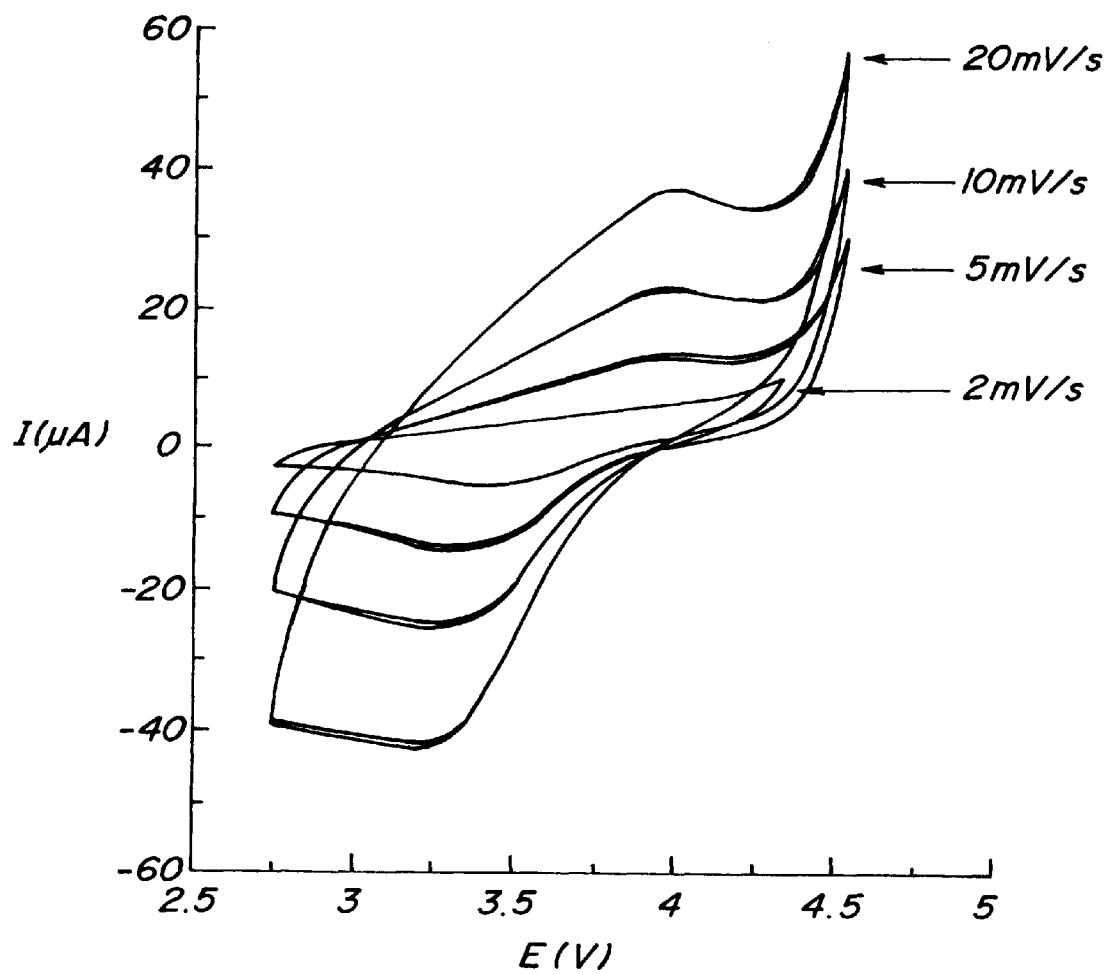
FIG. 5 shows the cyclic voltammogram of the prepared film at various scan rates.

FIG. 5 shows the cyclic voltammograms of the film of Example 1 at various scan rates. At any scan rates, the film exhibits very good reversibility and reproducibility.

Measurement of Conductivity of Lithium Ion

An impedance measurement has been performed to evaluate the lithium ionic conductivity of the obtained films. While the evaluated lithium ionic conductivity of the films depends on the synthetic conditions, the whole evaluated values are not so different. For the film of Example 1, its lithium ionic conductivity is $3 \times 10^{-5}$ S/cm. This value is very similar to that of the films obtained using gaseous deposition methods such as PVD and CVD, which indicates that the film obtained using the method of the invention is a good conductor for lithium ion.

FIG. 6 shows two overlapping semicircles. The semicircle at high frequencies in the Cole—Cole plot of the film of Example 1 corresponds to its lithium ionic conductivity.

As mentioned above, the method of the invention can fabricate lithium double oxide films on the surface of metal body with an arbitrary shape in a single synthetic step at low temperature. It is completely different from the conventional methods.

The invention is firstly disclosed as a novel method producing lithium double oxide films. The film composed of only lithium double oxide can be fabricated on various substrates. Moreover, the facility in applying the method of the invention gives the versatility in shaping, up-sizing and orienting films. Therefore, the method of the invention has lots of merits in comparison with any other methods for the film fabrication.

In addition, it should be an energy and material efficient, economical and environmentally friendly synthetic route.

What is claimed is:

1. A method of producing a double oxide film of a lithium element and a metal element other than the lithium element, in which the metal element is at least one element selected from the group consisting of Ni, Co, Mn, V, Fe, Cr, and Al, and which comprises a step of a hydrothermal reaction between a metal body made of said metal element and a lithium ion in an alkaline solution containing the lithium ion to form a double oxide film of the metal element making up the metal body and the lithium element on a surface of the metal body.

2. The method according to claim 1, wherein the alkaline solution contains not less than 0.1 mole/liter of the lithium ion.

3. The method according to claim 1, wherein a direct current having a current density of not less than 0.001 mA/cm$^2$ is applied to the metal body.

4. A double oxide/metal composite body comprising a double oxide film of a lithium element and a metal element other than the lithium element on a metal body made of said metal element, wherein the metal element making up the metal body is at least one element selected from the group consisting of Ni, Co, Mn, V, Fe, Cr and Al, and the metal body is immersed in an alkaline solution containing a lithium ion to conduct a hydrothermal reaction between the metal body and the lithium ion, whereby the double oxide film is formed on the surface of the metal body.

5. A double oxide film of a lithium element and a metal element other than the lithium element, in which the metal element is at least one element selected from the group consisting of Ni, Co, Mn, V, Fe, Cr and Al, and the double oxide film is formed on a surface of a metal body made of said metal element other than the lithium element by immersing the metal body in an alkaline solution containing lithium ion to conduct a hydrothermal reaction of the metal body and the lithium ion.

6. A functional conductive material comprising a double oxide film of a lithium element and a metal element other than the lithium element, in which the double oxide film is a double oxide film as claimed in claim 5.

* * * * *